(12) United States Patent
Champion et al.

(10) Patent No.: US 7,679,603 B2
(45) Date of Patent: Mar. 16, 2010

(54) SENSOR ARRAY

(75) Inventors: David A. Champion, Corvallis, OR (US); Anton N. Clarkson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 11/682,024

(22) Filed: Mar. 5, 2007

(65) Prior Publication Data

US 2008/0218485 A1 Sep. 11, 2008

(51) Int. Cl.
*G09G 5/00* (2006.01)
*G09G 5/08* (2006.01)

(52) U.S. Cl. .................. 345/156; 345/173; 345/169; 345/158

(58) Field of Classification Search .............. 345/156, 345/169, 173–181, 158, 659
See application file for complete search history.

(56) References Cited

U.S. PATENT DOCUMENTS

| | | | |
|---|---|---|---|
| 4,560,929 A | 12/1985 | Melnyk | |
| 4,786,765 A | 11/1988 | Yamanami et al. | |
| 5,115,107 A * | 5/1992 | Crooks et al. ................ | 345/178 |
| 5,134,689 A | 7/1992 | Murakami | |
| 5,570,113 A | 10/1996 | Zetts | |
| 5,661,269 A | 8/1997 | Fukuzaki et al. | |
| 5,693,914 A | 12/1997 | Ogawa | |
| 5,853,327 A | 12/1998 | Gilboa | |
| 5,869,789 A | 2/1999 | Reid-Green | |
| 6,621,410 B1 | 9/2003 | Lastinger et al. | |
| 6,690,156 B1 | 2/2004 | Weiner et al. | |
| 6,724,373 B1 | 4/2004 | O'Neill et al. | |
| 6,724,374 B1 | 4/2004 | Lapstun et al. | |
| 6,738,050 B2 | 5/2004 | Comiskey et al. | |
| 6,853,486 B2 | 2/2005 | Cruz-Uribe et al. | |
| 6,922,779 B1 | 7/2005 | Lapstun et al. | |
| 7,030,782 B2 | 4/2006 | Ely et al. | |
| 7,072,108 B2 | 7/2006 | Cruz-Uribe et al. | |
| 7,079,119 B2 | 7/2006 | Hanson et al. | |
| 7,391,930 B2 * | 6/2008 | Shih et al. .................... | 382/289 |
| 2006/0012581 A1 | 1/2006 | Haim et al. | |
| 2006/0279552 A1* | 12/2006 | Tonouchi ..................... | 345/173 |

FOREIGN PATENT DOCUMENTS

| | | |
|---|---|---|
| JP | 63-184823 A | 7/1988 |
| JP | 2000-172444 A | 6/2000 |

* cited by examiner

*Primary Examiner*—Duc Q Dinh

(57) ABSTRACT

Embodiments of a sensor array are disclosed.

20 Claims, 3 Drawing Sheets

SENSOR ARRAY

BACKGROUND

Electronic display systems display information that is input by a user using an input device. These systems are typically built with a fixed relationship between a display surface that displays the information and sensors that detect the information that is input by the user. To achieve the fixed relationship, the display surface and the sensors are typically combined into a single unit where the display surface and the sensors are not intended to be separated. The combination of the display surface and the sensors can make the system large, expensive, or impractical for certain applications.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

According to one embodiment, an information system determines an arbitrary orientation between a sensor array that is mounted on or in a substrate and a removable display surface. When the display surface is placed on the sensor array, the information system detects the orientation of the display surface relative to the sensor array by detecting the positions of at least two tank circuits of the display surface. The tank circuits are configured in predefined locations on or in the display surface. After determining the orientation of display surface relative to sensor array, the information system stores information that is input by a user with an input device. The information system stores the input information according to the orientation of the display surface relative to the sensor array so that the input information will appear in the same orientation relative to the display surface when it is reproduced.

Figure 1A:
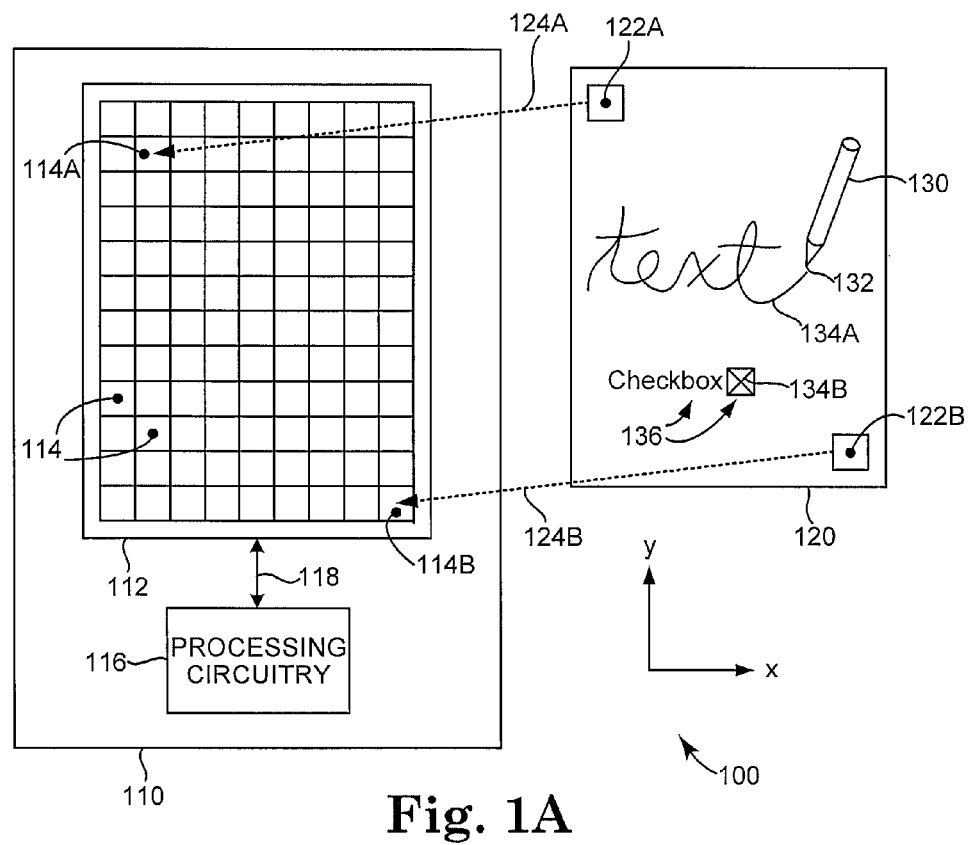
FIGS. 1A-1B are schematic diagrams illustrating top and side views of one embodiment of an information system.
Figure 1B:
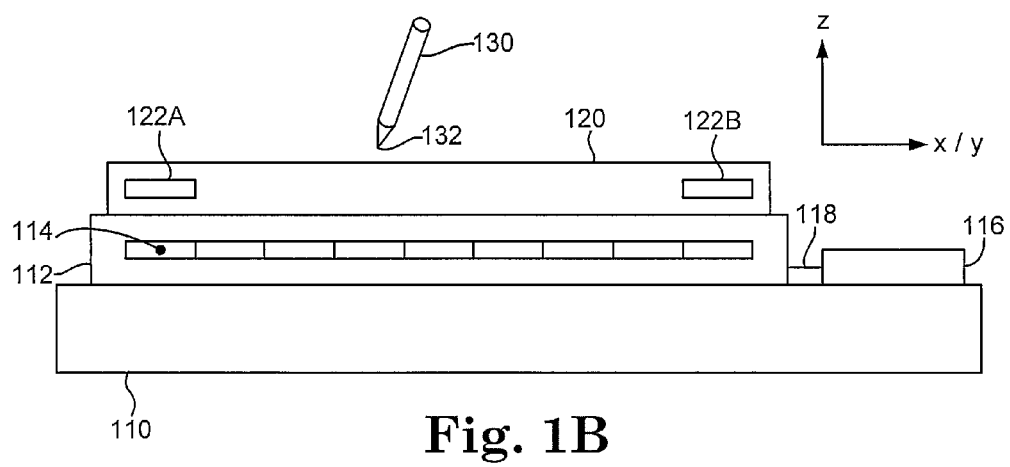

FIGS. 1A and 1B are schematic diagrams illustrating top and side views, respectively, of one embodiment of an information system 100. Information system 100 includes a substrate 110 and at least one removable display surface 120. Substrate 110 includes an inductive sensor array 112 with a plurality of sensors 114 that operate in conjunction with processing circuitry 116. Display surface 120 includes at least two tank circuits 122A and 122B in predefined locations on or in display surface 120. Each display surface 120 is placed on sensor array 112 in any arbitrary orientation in a plane formed by the x and y axes in one embodiment. An input device 130 also includes a tank circuit 132 that allows a user to provide input information 134 (e.g., handwritten text 134A or a location indication 134B) to information system 100.

Substrate 110 may be any suitable portable or non-portable surface that is configured to include sensor array 112. Sensor array 112 may be mounted on, embedded in, attached to, affixed to, integrally formed with, or otherwise combined with substrate 110 to form a surface on which display surface 120 may be removably placed. The surface formed by substrate 110 and sensor array 112 may be planar or, where display surface 120 is flexible, may be partially planar or non-planar (e.g., curved). For example, the surface formed by substrate 110 and sensor array 112 may be a desktop, a tabletop, a workstation, a data entry station, or a clipboard. Substrate 110 also includes power source (not shown) for providing power to sensor array 112 and/or processing circuitry 116. Substrate 110 may further include a support apparatus (not shown) for temporarily holding display surface 120 in place in one embodiment.

Sensor array 112 includes a plurality of inductive touch sensors 114 that are arranged in any suitable way, such as the row and column arrangement shown in FIG. 1A. Each sensor 114 forms a coil, a loop antenna, or other suitable structure that is configured to emit and receive electromagnetic energy in response to control signals from processing circuitry 116. Each sensor 114 is configured to emit energy (e.g., send out a signal) that is configured to be received by tank circuits 122A and 122B in display surface 120 and a tank circuit 132 in input device 130 when tank circuits 122A, 122B, and/or 132 are in close proximity to one or more sensors 114. Each sensor 114 is also configured to detect energy (e.g., receive a signal) that is emitted from tank circuits 122A, 122B, and 132 when tank circuits 122A, 122B, and/or 132 are in close proximity to one or more sensors 114. Sensor array 112 operates to emit and receive energy in response to control signals from processing circuitry 116 using a connection 118. Sensor array 112 also provides information from sensors 114 to processing circuitry 116 using connection 118.

Processing circuitry 116 provides control signals to and receives information from sensor array 112 using connection 118. Processing circuitry 116 provides control signals to cause sensors 114 to emit energy to tank circuits 122A, 122B, and 132 and to cause sensors 114 to receive energy from tank circuits 122A, 122B, and 132. Processing circuitry 116 receives information from sensor array 112 that indicates which sensors 114 received energy from tank circuits 122A, 122B, and/or 132. Processing circuitry 116 processes the information to determine an orientation of display surface 120 relative to sensor array 112 and to identify information 134 entered using input device 130 as will described in additional detail below with reference to FIGS. 2-4B.

Processing circuitry 116 may be mounted on, embedded in, attached to, affixed to, integrally formed with, or otherwise combined with substrate 110 and/or sensor array 112 in one embodiment. In other embodiments, processing circuitry 116 may be located separately and/or remotely from substrate 110 and/or sensor array 112.

Connection 118 may be any suitable wired or wireless connection configured to allow direct communication (e.g., a direct wired or wireless connection) or indirect communication (e.g., by way of one or more intermediate devices) between processing circuitry 116 and sensor array 112.

Display surface 120 may be any suitable electronic or non-electronic surface configured to display information 134 input by a user using input device 130. In one embodiment, display surface 120 is electronic paper, an electronic form, or another thin, portable electronic display device that is configured to electronically display information 134 input by a user using input device 130. In these embodiments, display surface 120 may include a liquid crystal display (LCD) or an electroferretic display. In another embodiment, display surface 120 is regular (i.e., non-electronic) paper or another non-electronic medium configured to display information 134 using a marking substance (e.g., ink or lead) input by a user using input device 130. In this embodiment, input device 130 is configured to transfer the marking substance to display surface 120 in addition to providing signals from tank circuit 132 to sensor array 112. Display surface 120 may include or be configured to display predefined textual or graphical information, such as a checkbox indicator 136 with text and a graphical box as shown in FIG. 1A.

Display surface 120 may operate independently of or dependently on processing circuitry 116 in the display of information 134 that is input by a user using input device 130. In one embodiment, display surface 120 directly detects and displays input information 134 using sensors (not shown) that detect input information 134 and display elements (not shown) that display input information 134 electronically without communicating with processing circuitry 116. In another embodiment, display surface 120 displays input information 134 formed from a marking substance (e.g., ink or lead) from input device 130 without detecting or displaying input information 134 electronically and without communicating with processing circuitry 116. In a further embodiment, display surface 120 includes an interface (not shown) to processing circuitry 116 and displays input information 134 electronically according to signals received from processing circuitry 116. In this embodiment, processing circuitry 116 provides information to display surface 120 to cause input information 134 to be displayed in display surface 120. In other embodiments, display surface 120 and processing circuitry 116 may interact in other suitable ways to display of information input 134 by a user using input device 130.

Display surface 120 includes at least two tank circuits 122A and 122B that are configured in predefined locations on or in display surface 120. Tank circuits 122A and 122B may be mounted on, embedded in, attached to, affixed to, integrally formed with, or otherwise combined with display surface 120 in the predefined locations. In the embodiment of FIG. 1A, tank circuits 122A and 122B are located near opposite corners of display surface 120. In other embodiments, tank circuits 122A and 122B may be located in any other suitable positions in display surface 120.

Tank circuits 122A and 122B are each configured to emit electromagnetic energy in response to being energized by electromagnetic energy received from one or more sensors 114. Tank circuits 122A and 122B emit the energy at a resonant frequency determined from the inductive and capacitive properties of each tank circuit 122A and 122B, respectively. Tank circuits 122A and 122B may each be configured with the same or different inductive and capacitive properties so that tank circuits 122A and 122B may have the same or different resonant frequencies. Where tank circuits 122A and 122B have different resonant frequencies, processing circuitry 116 may individually identify the location of tank circuits 122A and 122B relative to sensor array 112.

In other embodiments, display surface 120 includes three or more tank circuits 122 configured in predefined locations on or in display surface 120. For example, where display surface 120 includes three or more tank circuits 122, processing circuitry 116 may determine which side of display surface 120 (i.e., the top side or the bottom side) is placed on sensor array 112 from the orientation of tank circuits 122. Accordingly, display surface 120 may be configured to display input information on both a top side and a bottom side in these embodiments.

Display surface 120 may be of a different type or size in different embodiments of information system 100. Each type and/or size of display surface 120 may have a unique configuration of two or more tank circuits that allow processing system 116 to identify the type and/or size of display surface 120 from the configuration of the tank circuits. In addition, additional information regarding each display surface 120 may be encoded into the resonant frequencies of the tank circuits of a display surface 120. Accordingly, processing circuitry 116 may determine a type, size, or other characteristics of display surface 120 from the resonant frequency or frequencies of tank circuits 122A and 122B or the configuration of tank circuits 122A and 122B in display surface 120.

Input device 130 may be any suitable device, such as a stylus or pen, that includes tank circuit 132. Tank circuit 132 is configured to receive electromagnetic energy emitted by one or more sensors 114 in response to being in close proximity to one or more sensors 114. Tank circuit 132 is configured to emit electromagnetic energy in response to being energized by the energy from one or more sensors 114. Tank circuit 132 emits the energy at a resonant frequency determined from the inductive and capacitive properties of tank circuit 132. Additional information regarding input device 130 may be encoded into the resonant frequency of tank circuit 132. Accordingly, processing circuitry 116 may determine a type or other characteristics of input device 130 from the resonant frequency of tank circuit 132.

Input device 130 allows a user to provide any suitable type of input information such as handwritten text 134A and location indication 134B (e.g., an indication to check or uncheck checkbox 136) to sensor array 112. Input device 130 may also include a mechanism (not shown) configured to transfer a marking substance (e.g., ink or lead) to display surface 120.

Information system 100 is configured to establish an electronic registration between sensor array 112 and display surface 120. Display surface 120 may be placed in any arbitrary orientation on sensor array 112. Information system 100 determines the orientation of display surface 120 relative to sensor array 112 by detecting the positions of tank circuits 122A and 122B relative to sensor array 112 and accessing information that identifies the predefined locations of tank circuits 122A and 122B on or in display surface 120. After determining the orientation of display surface 120 relative to sensor array 112, information system 100 stores information 134 that is input by a user with input device 130. Information system 100 stores input information 134 according to the orientation of display surface 120 relative to sensor array 112 so that input information 134 will appear in the same orientation relative to display surface 120 when it is reproduced.

As shown in FIG. 1A and 1B, display surface 120 may be placed on sensor array 112 in any arbitrary orientation in a plane formed by the x and y axes. In response to being placed on sensor array 112, tank circuits 122A and 122B each align, in the z direction, with a sensor 114. In the example of FIG. 1A, tank circuit 122A aligns with a sensor 114A as indicated by an arrow 124A and tank circuit 122B aligns with a sensor 114B as indicated by an arrow 124B.

Figure 2:
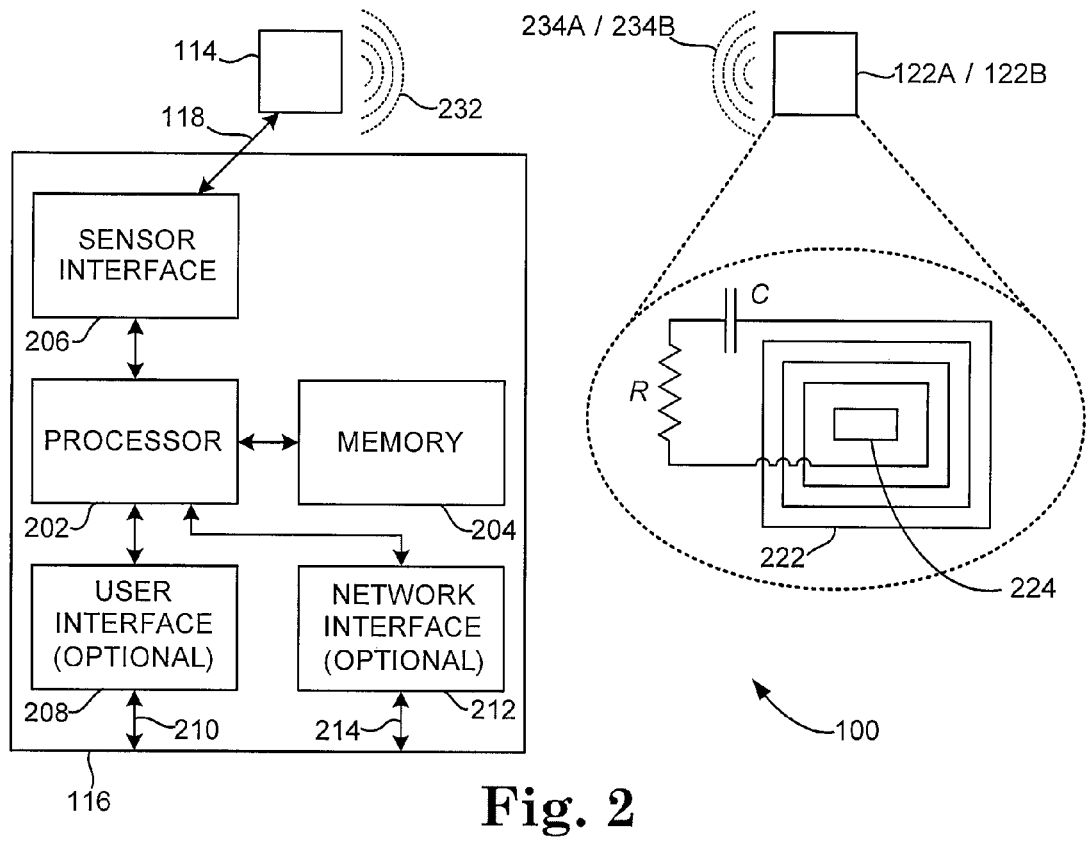
FIG. 2 is a schematic diagram illustrating one embodiment of the operation an information system.
Figure 3:
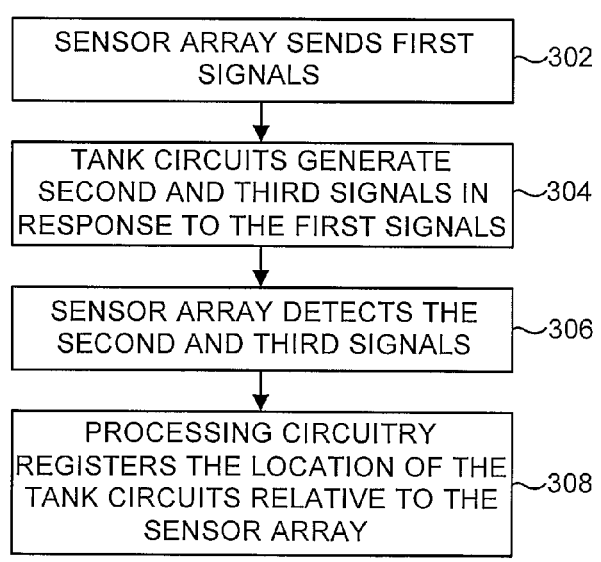
FIG. 3 is a flow chart illustrating one embodiment of a method performed an information system.

The establishment of an electronic registration between sensor array 112 and display surface 120 by information system 100 using tank circuits 122A and 122B will now be described with reference to FIGS. 2 and 3. FIG. 2 is a schematic diagram illustrating one embodiment of the operation information system 100, and FIG. 3 is a flow chart illustrating one embodiment of a method performed information system 100.

As shown in the embodiment of FIG. 2, processing circuitry 116 includes a processor 202, a memory 204, a sensor interface 206, a user interface 208 (which may not be included in some embodiments) with a connection 210, and a network interface 212 (which may not be included in some embodiments) with a connection 214. Processor 202 is configured to store information received from sensor array 112 in memory 204. Memory 204 includes any type or combination of volatile and non-volatile memory devices. Processor 202 is configured to control the operation of sensor array 112 and receive information from sensor array 112 using sensor interface 206. Sensor interface 206 couples directly or indirectly to connection 118. User interface 208 connects to one or more input/output devices (not shown) that are configured to allow a user to control the operation of processing circuitry 116 across a connection 210. Network interface 212 connects to a network (not shown) with one or more network devices (not shown) and is configured to transfer information between processing circuitry 116 and the network.

Processing circuitry 116 may include any combination of hardware and software components configured to perform the operations of processor 202, memory 204, sensor interface 206, user interface 208, and network interface 212. The functions performed by processing circuitry 116 may be embodied in a program product stored in any suitable portable or non-portable media (e.g., memory 204) with instructions that are executable by a processor (e.g., processor 202).

Processing circuitry 116 determines the electronic registration between sensor array 112 and display surface 120 using tank circuits 122A and 122B in one embodiment. To do so, processor 202 causes control signals to be sent across sensor interface 206 to sensor array 112 to detect the presence of tank circuits 122A and 122B. Sensor array 112 provides information to processor 202 that indicates the positions of tank circuits 122A and 122B relative to sensor 112. Processing circuitry 116 processes these positions, along with information that indicates the predefined configuration of tank circuits 122A and 122B in display surface 120, to determine the orientation of display surface 120 relative to sensor array 112.

Additional details of determining the positions of tank circuits 122A and 122B relative to sensor 112 will now be described with reference to FIGS. 2 and 3 according to one embodiment.

In FIG. 3, sensor array 112 sends first signals 232 as indicated in a block 302. Processing circuitry 116 provides control signals to cause all or selected sensors 114 in sensor array 112 to be energized. In response to being energized, sensors 114 each emit a signal 232.

Tank circuits 122A and 122B receive energy from the first signals 232. Tank circuits 122A and 122B each include an induction coil 222 that winds around a ferrite core 224. Induction coil 222 has a resistance indicated by a resistor, R, and a capacitance indicated by a capacitor, C. Induction coil 222 and ferrite core 224 allow tank circuits 122A and 122B to inductively couple energy from the sensor array and emit the energy with a resonant frequency of 1/LC. In response to the energy from first signals 232, tank circuits 122A and 122B generate second and third signals 234A and 234B, respectively, as indicated in a block 304. Second and third signals 234A and 234B may have the same frequency or different resonant frequencies.

Sensor array 112 detects second and third signals 234A and 234B as indicated in a block 306. Sensors 114 receive the energy from second and third signals 234A and 234B. Sensor array 112 provides information to processing circuitry 116 that indicates the relative strength of the energy received by each sensor 114.

From the information from sensor array 112, processing circuitry 116 determines which sensors 114 most closely align with tank circuits 122A and 122B. Processing circuitry 116 may make this determination by determining which sensors 114 receive the most energy or by any other suitable algorithm. In the example of FIG. 1A, tank circuit 122A most closely aligns with sensor 114A, and tank circuit 122B most closely aligns with sensor 114B.

Processing circuitry 116 also accesses information that indicates the predefined configuration of tank circuits 122A and 122B in display surface 120. The predefined configuration information may be stored in memory 204, may be input by a user across user interface 208, or accessed across a network using network interface 212. The predefined configuration information may indicate the positions of tank circuits 122A and 122B in display surface 120 in any suitable format.

Processing circuitry 116 registers the location of tank circuits 122A and 122B relative to sensor array 112 as indicated in a block 308. To do so, processing circuitry 116 merges the positions of the sensors 114 that most closely align with tank circuits 122A and 122B and with the predefined configuration of tank circuits 122A and 122B in display surface 120 to determine an orientation of display surface 120 on sensor array 112. Processing circuitry 116 stores this orientation as a registration between display surface 120 and sensor array 112.

Processing circuitry 116 may perform the method of FIG. 3 at any suitable periodic interval to continuously update the registration between display surface 120 and sensor array 112. By doing so, processing circuitry 116 may detect if display surface 120 moves or is otherwise adjusted relative to sensor array 112 by a user during the operation of information system 100.

Figure 4A:
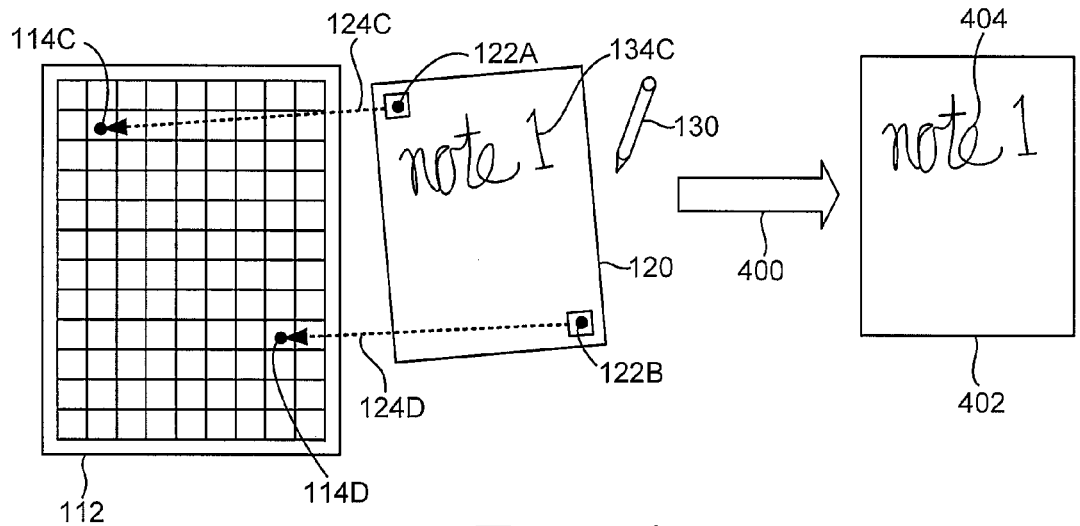
FIGS. 4A-4B are schematic diagrams illustrating examples of arbitrary orientations of a display surface on a sensor array.
Figure 4B:
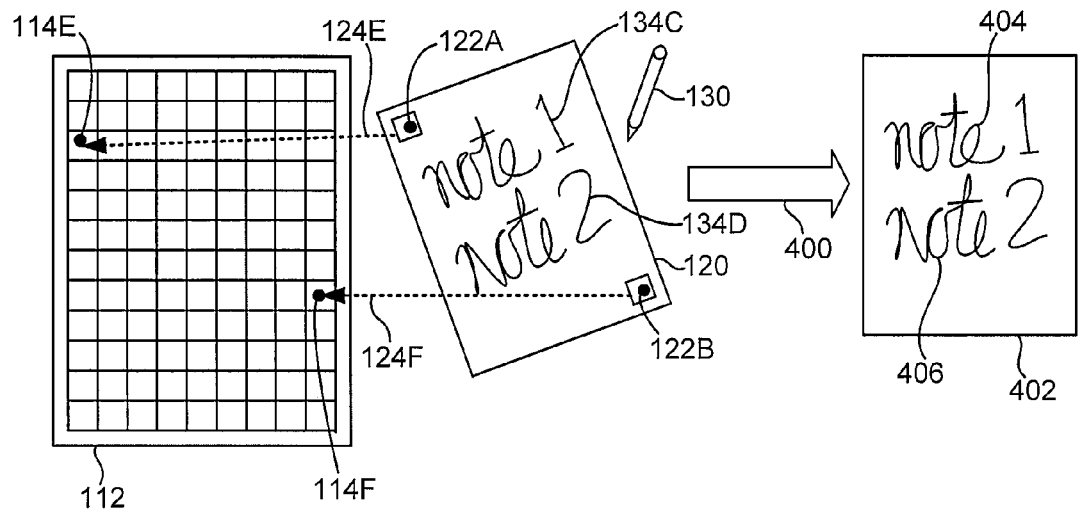

FIGS. 4A-4B are schematic diagrams illustrating examples of arbitrary orientations of display surface 120 on sensor array 112. In FIG. 4A, display surface 120 is placed in a first orientation on sensor array 112. Using the method described with reference to FIG. 3, processing circuitry 116 determines that tank circuit 122A most closely aligns with a sensor 114C, and tank circuit 122B most closely aligns with sensor 114D. Using this information and predefined configuration information for display surface 120, processing circuitry 116 registers the location of tank circuits 122A and 122B relative to sensor array 112 for the first orientation.

In response to a user entering information 134C, processing circuitry 116 stores information 134C using the registration between tank circuits 122A and 122B and sensor array 112 for the first orientation so that information 134C will appear in the same orientation relative to display surface 120 when it is reproduced. In FIG. 4A, information 134C is shown as being reproduced as information 404 on media 402 as indicated by an arrow 400. Information 404 appears within media 402 in the same orientation as information 134C appears within display surface 120.

In FIG. 4B, display surface 120 is placed in, moved to, or otherwise adjusted to a second orientation on sensor array 112. Using the method described with reference to FIG. 3, processing circuitry 116 determines that tank circuit 122A most closely aligns with a sensor 114E, and tank circuit 122B most closely aligns with sensor 114F. Using this information and predefined configuration information for display surface 120, processing circuitry 116 registers the location of tank circuits 122A and 122B relative to sensor array 112 for the second orientation.

In response to a user entering information 134D, processing circuitry 116 stores information 134D using the registration between tank circuits 122A and 122B and sensor array 112 for the second orientation so that information 134D will appear in the same orientation relative to display surface 120 when it is reproduced. In FIG. 4B, both information 134C and information 134D are shown as being reproduced as information 404 and information 406, respectively, on media 402 as indicated by an arrow 400. Information 404 and information 406 appear within media 402 in the same orientation as information 134C and information 134D appears within display surface 120, respectively.

In embodiments described above, processing circuitry 116 is configured to determine an orientation for each display surface 120 that is placed on sensor array 112. Processing circuitry 116 stores information for each display surface 120 separately, such that the information is associated with a display surface 120 that was on sensor array 112 at the time that the information was input. Accordingly, various types of display surfaces 120 may be used in information system 100.

In other embodiments, processing circuitry 116 may be configured to determine registrations for two or more display surfaces 120 that are on sensor array 112 at the same time. Sensor array 112 may be configured to be sufficiently large to allow two or more display surfaces 120 to be placed on sensor array 112. Processing circuitry 116 may store input information for each of these display surfaces 120 separately to allow multiple users to input information for multiple display surfaces 120 using one or more input devices 130.

By providing a system and method for determining a registration between display surface 120 and sensor array 112, information system 100 allows sensor array 112 to be located apart from display surface 120. As a result, information system 100 may be configured to operate with various types and sizes of display surfaces 120. Because display surface 120 does not include sensor array 112, display surface 120 may be manufactured with a thinner form factor and may be physically flexible.

The use of information system 100 enables the location of textual or other inputs by a user using input device 130 relative to the tank circuits of a display surface 120. Accordingly, input information may be stored and reproduced as it appears on display surface 120.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A registration system comprising:
   first means for displaying first information, input with an input device, and for including at least first and second tank circuits in a predefined configuration; and
   second means for determining a first arbitrary orientation of the first means relative to a sensor array using the first and the second tank circuits in response to the first means being placed on the sensor array.

2. The registration system of claim 1 wherein the first means is for electronically displaying the first information.

3. The registration system of claim 1 wherein the first means is for displaying the first information with a marking substance.

4. The registration system of claim 1 wherein the second means is for determining the first arbitrary orientation of the first means relative to the sensor array using the first and the second tank circuits and second information that identifies the predefined configuration.

5. The registration system of claim 1 wherein the second means is for determining the first arbitrary orientation of the first means relative to the sensor array by identifying at least first and second sensors in the sensor array that most closely align with the first and the second tank circuits in response to the first means being placed on the sensor array.

6. The registration system of claim 1 wherein the second means is for detecting the first information that is input with the input device.

7. The registration system of claim 1 wherein the second means is for storing the first information that is input with the input device in accordance with the first arbitrary orientation.

8. The registration system of claim 1 wherein the second means is for determining a second arbitrary orientation of the first means relative to the sensor array using the first and the second tank circuits in response to the first means being moved on the sensor array.

9. A method comprising:
   sending a first plurality of signals from a sensor array with a plurality of sensors; and
   determining a first orientation of a display surface by identifying first and second ones of the plurality of sensors that receive first and second signals, respectively, in response to the first plurality of signals and by using first information that identifies a configuration of at least first and second tank circuits of the display surface.

10. The method of claim 9 wherein the first and the second signals are generated by the first and the second tank circuits, respectively.

11. The method of claim 9 further comprising:
   identifying a third of the plurality of sensors that receives a third signal generated by a third tank circuit of the input device in response to the first plurality of signals; and
   storing second information associated with the third signal.

12. The method of claim 9 wherein the first and the second ones of the plurality of sensors most closely align with the first and the second tank circuits.

13. The method of claim 9 further comprising:
   sending a second plurality of signals from the sensor array; and
   determining a second orientation of the display surface by identifying third and fourth ones of the plurality of sensors that receive third and fourth signals, respectively, in response to the second plurality of signals and by using the first information.

14. A system comprising:
   a sensor array configured to detect first information input to a display surface including at least first and second tank circuits using an input device and configured to detect first and second positions of the first and the second tank circuits, respectively, relative to the sensor array in response to the display surface being placed on the sensor array.

15. The system of claim 14 further comprising:

processing circuitry configured to determine an orientation of the display surface relative to the sensor array using the first and the second positions and second information that identifies a predefined configuration of the first and the second tank circuits.

16. The system of claim 15 wherein the processing circuitry is configured to store the first information in accordance with the orientation.

17. The system of claim 14 wherein the first and the second tank circuits include first and second induction coils, respectively.

18. The system of claim 14 wherein the sensor array is configured to detect the first information in response to the input device being placed in close proximity to the display surface.

19. The system of claim 14 further comprising:
the display surface configured to display the first information; and
a substrate that includes the sensor array.

20. The system of claim 19 wherein the substrate is one of a desktop, a tabletop, a workstation, a data entry station, and a clipboard.

* * * * *